(12) United States Patent
Kobayashi et al.

(10) Patent No.: US 8,437,638 B2
(45) Date of Patent: May 7, 2013

(54) OPTICAL MODULATION CIRCUIT AND OPTICAL TRANSMISSION SYSTEM

(75) Inventors: Takayuki Kobayashi, Yokosuka (JP); Akihide Sano, Yokohama (JP); Yutaka Miyamoto, Yokosuka (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 356 days.

(21) Appl. No.: 12/664,745

(22) PCT Filed: Jul. 4, 2008

(86) PCT No.: PCT/JP2008/062182
§ 371 (c)(1),
(2), (4) Date: Dec. 15, 2009

(87) PCT Pub. No.: WO2009/008370
PCT Pub. Date: Jan. 15, 2009

(65) Prior Publication Data
US 2010/0220376 A1 Sep. 2, 2010

(30) Foreign Application Priority Data
Jul. 6, 2007 (JP) .................................. 2007-177871

(51) Int. Cl.
*H04B 10/04* (2006.01)
*H04J 14/02* (2006.01)

(52) U.S. Cl.
USPC .......................................................... 398/90

(58) Field of Classification Search ................ 398/90–91
See application file for complete search history.

(56) References Cited

U.S. PATENT DOCUMENTS 3,920,983 A    11/1975    Schlafer et al.
3,980,983 A *   9/1976    Shannon ........................ 367/99

(Continued)

FOREIGN PATENT DOCUMENTS

JP    05-231923 A    9/1993
JP    11-337894 A    12/1999

(Continued)

OTHER PUBLICATIONS

Arthur James Lowery, Limn Du and Jean Armstrong, "Orthogonal Frequency Division Multiplexing for Adaptive Dispersion Compensation in Long Haul WDM Systems," Optical Fiber Communication Conference 2006, PDP39 (2006).

(Continued)

*Primary Examiner* — Leslie Pascal
(74) *Attorney, Agent, or Firm* — Harness, Dickey & Pierce, P.L.C.

(57) ABSTRACT

An optical modulator and an optical transmission system convert continuous light of a multiple wavelength light source, which generates the continuous light with a fixed and complete phase but different frequencies, to a modulator driving signal so as to generate a light subcarrier with each frequency at the center and modulate the continuous light to the light subcarrier by using the modulator driving signal. In the case where an optical modulation is carried out by an optical IQ-modulator, transmitting data, for example, is converted to two parallel data A(t) and B(t), an I phase signal, in which the data A(t)+B(t) are modulated with a clock signal with a frequency $\omega$, and a Q phase signal, in which the data A(t)−B(t) are modulated with a clock signal with a $\pi/2$ phase shifted, are generated, and the I phase signal and the Q phase signal are applied to electrodes of the optical IQ-modulator, respectively.

23 Claims, 11 Drawing Sheets

U.S. PATENT DOCUMENTS

| | | | |
|---|---|---|---|
| 7,035,543 B1 * | 4/2006 | Hoshida et al. | 398/79 |
| 2007/0003290 A1 * | 1/2007 | Menendez | 398/190 |

FOREIGN PATENT DOCUMENTS

| | | |
|---|---|---|
| JP | 2000-056279 A | 2/2000 |
| JP | 2003-304197 A | 10/2003 |
| JP | 2004-072690 A | 3/2004 |
| JP | 2004-252386 A | 9/2004 |
| JP | 2004-350184 A | 12/2004 |
| JP | 2005-311722 A | 11/2005 |
| JP | 2006-270990 A | 10/2006 |
| JP | 2006-276874 A | 10/2006 |
| JP | 2008-135950 A | 6/2008 |
| WO | 2007/023857 * | 3/2007 |

OTHER PUBLICATIONS

Brendon J.C. Schmidt, Arthur James Lowery and Jean Armstrong, "Experimental Demonstrations of 20 Gbit/s Direct-Detection Optical OFDM and 12 Gbit/s with a colorless transmitter," Optical Fiber Communication Conference 2007, PDP18 (2007).

Notice of Reasons for Rejection, Japanese Patent Application No. 2007-177871, Apr. 5, 2011.

* cited by examiner

INTENSITY MODULATOR

SSB MODULATOR

PRESENT INVENTION

OPTICAL MODULATION CIRCUIT AND OPTICAL TRANSMISSION SYSTEM

TECHNICAL FIELD

The present invention relates to a multicarrier modulation technique for transmitting binary data in a plurality of subcarriers.

Priority is claimed on Japanese Patent Application No. 2007-177871, filed on Jul. 6, 2007, the contents of which are incorporated herein by reference.

BACKGROUND ART

As a technique for providing a large capacity in optical fiber transmission, the wavelength division multiplexing (WDM) technique is used in which a symbol rate for a single carrier is increased to narrow the channel spacing for an increased number of multiplexes, to thereby achieve an enlarged transmission capacity.

However, an increase in symbol rate results in a more noticeable influence of a chromatic dispersion and a polarization mode dispersion (PMD) in a transmission fiber. Therefore, a sophisticated compensation technique is required. In addition, in order to obtain necessary receiver sensitivity, more power is required. This leads to a problem of suppressing a nonlinear optical effect produced in the fiber such as self phase modulation (SPM), four wave mixing (FWM), or cross phase modulation (XPM). In addition, with the increase in symbol rate, an occupied band for a single channel is expanded. This makes it difficult to increase the number of WDM channels.

Here, symbol rate is synonymous with baud rate, which is a bit rate to be transmitted divided by the number of bits of the modulation code. For example, if it is assumed that the bit rate is B (b/s) and that an M-ary modulation code is used, then the symbol rate is given by B/log 2 (M) (symbol/sec).

To solve this problem, what used to be transmitted in a single carrier manner is divided into subcarriers at a symbol rate that does not require a sophisticated compensation technique and then the subcarriers are transmitted. Thereby, it is possible to suppress chromatic dispersion and PMD, and an influence of a nonlinear optical effect.

If an orthogonal frequency division multiplexing (OFDM) modulation, which is often used in wireless transmission, is performed on data, and continuous light emitted from a continuous light source is modulated by an intensity modulator or a single sideband (SSB) modulator driven with an OFDM signal, then optical OFDM transmission can be implemented (for example, see Patent Document 1, or Non-Patent Document 1 or 2).

Patent Document 1: Japanese Unexamined Patent Application, First Publication No. 2005-311722

Non-Patent Document 1: Arthur James Lowery et al., "Orthogonal Frequency Division Multiplexing for Adaptive Dispersion Compensation in Long Haul WDM Systems," Optical Fiber Communication Conference 2006, PDP 39 (2006)

Non-Patent Document 2: Brendon J. C. Schmidt et al., "Experimental Demonstration of 20 Gbit/s Direct-Detection Optical OFDM and 12 Gbit/s with a colorless transmitter," Optical Fiber Communication Conference 2007, PDP18 (2007).

DISCLOSURE OF INVENTION

Technical Problem

However, the scheme using an intensity modulator or an SSB modulator has the following problems.

To generate an OFDM signal from a data signal as described in Non-Patent Documents 1 and 2, a high-speed Fourier transform circuit, and a high-speed D/A converter is needed. In the case such as in Patent Document 1, there are required as many modulators as the optical subcarriers that are intended to be generated, and an oscillator that supplies a clock with a frequency equal to the symbol rate of the data signal to a modulator drive signal generation circuit. Therefore, it is difficult to obtain a high-speed operation and control.

Patterns of optical modulation will be described with reference to FIG. 11A to FIG. 11C. In FIG. 11A to FIG. 11C, the axis of abscissa represents optical frequency, and the axis of ordinate represents optical intensity. FIG. 11A and FIG. 11B show an optical spectrum in conventional modulation schemes. In the case where an intensity modulator is driven with an OFDM signal, the optical spectrum is as shown in FIG. 11A. The identical subcarrier groups are produced on both sides of the optical carrier frequency. This results in a problem in that the occupied band is wider than in the single carrier transmission.

Furthermore, in the case where an intensity modulator and an SSB modulator are driven with an OFDM signal, the optical spectrum is as shown respectively in FIG. 11A and FIG. 11B. Therefore, to efficiently wavelength-multiplex the optical OFDM signal, it is required to use an optical filter to filter an optical carrier with a frequency of fc emitted from the continuous light source, to thereby cut out an optical OFDM signal. Alternatively, it is required to perform an SSB modulation on the optical carrier. In addition, in the case where an OFDM signal in a single sideband is suppressed by filtering, it is required to insert a guard band. This makes requirements for the electrical/optical circuit more rigid.

In the case of wavelength-multiplexing an optical OFDM signal that is produced by modifying continuous light emitted from a continuous light source by means of an intensity modulator or an SSB modulator driven with an OFDM signal, the aforementioned problems arise. Therefore, it is required to provide a guard band. This prevents effective utilization of frequency bands of light.

The present invention has been achieved against such a backdrop, and has an object to provide an optical modulation circuit and an optical transmission system capable of reducing the number of oscillators and the drive frequency that are required in generation of optical subcarriers to half or less those of the conventional one, capable of narrowing an occupied band (for example, see FIG. 11C), and capable of suppressing chromatic dispersion and PMD, and an influence of a nonlinear optical effect, in optical transmission.

Technical Solution

An optical modulation circuit of the present invention comprises: a continuous light source which generates continuous light with a constant power; a modulator drive signal generation unit which modulates data to be transmitted into modulator drive signals such as to generate optical subcarriers which have m (m≧1) and l (l≧1) (in total, l+m) different frequencies respectively before and after a frequency of the continuous light and on which different data is superimposed; and an optical modulation unit which modulates the continuous light from the continuous light source into the optical subcarriers using the modulator drive signals.

In the optical modulation circuit of the present invention, the modulator drive signal generation unit may generate the modulator drive signal which superimposes phase-shift keying, intensity modulation, and quadrature amplitude modulation for every frequency of the optical subcarriers.

The optical modulation circuit of the present invention may comprise: an optical multicarrier generation unit which generates optical multicarriers with co-phased n (n≧2) different frequencies based on the continuous light from the continuous light source; an optical dividing unit which divides the optical multicarrier for each of the n different frequencies so as to output n optical carriers; and an optical combining unit connected to the optical modulation unit, wherein the modulator drive signal generation unit modulates data to be transmitted into n of the modulator drive signals such as to generate optical subcarriers which further have the m (m≧1) and l (l≧1) (in total, l+m) different frequencies respectively before and after each of the frequencies of the n optical carriers and on which different data is superimposed, the modulation unit uses the n modulator drive signals to further modulate the n optical carriers into l+m of the optical subcarriers, and the optical combining unit combines a total of n×(l+m) of the optical subcarriers.

In this manner, the optical multicarrier generation portion is used to generate optical multicarriers. Thereby, it is possible to decrease the bit rate and the band of the signal generated by every optical modulator compared with the case where the same number of optical subcarriers at the same transmission speed is generated without using the optical multicarrier generation portion. Therefore, it is possible to mitigate requirements such as an electric circuit speed of the modulator drive signal generation portion and an operating band of the optical modulators.

The optical modulation circuit of the present invention may make the symbol rate of the optical subcarriers equal to the distance between the optical subcarriers, to thereby put the optical subcarriers and the distance between the optical subcarriers in an orthogonal state. Consequently, it is possible to detect the optical subcarriers without receiving linear interference and also to narrow the necessary band of light compared with that in a single carrier transmission.

In the optical modulation circuit of the present invention, the multicarrier generation unit may impart a double-sideband with carrier suppression modulation by a sinusoidal wave to the continuous light source.

In the optical modulation circuit of the present invention, the optical modulation unit may comprise n optical IQ-modulators.

In the optical modulation circuit of the present invention, the modulator drive signal generation unit may convert transmission data into two pieces of parallel data: A(t) and B(t), may generate an I-phase signal resulting from A(t)+B(t) modified with a clock signal with an angular frequency of w and a Q-phase signal resulting from A(t)−B(t) modified with a signal that is out of phase by n/2 from the clock signal, and may apply the I-phase signal and the Q-phase signal on corresponding electrodes of each of the optical IQ-modulators.

In the optical modulation circuit of the present invention, the modulator drive signal generation unit may convert transmission data into 2n pieces of parallel data of $A1(t)$, $A2(t), \ldots, An(t)$ and $B1(t), B2(t), \ldots, Bn(t)$, may generate an I-phase signal resulting from adding the 2n pieces of parallel data for k=1 to n, which have been modified respectively with n clock signals with angular frequencies of $\omega 1, \omega 2, \ldots, \omega n$ and a Q-phase signal resulting from adding $Ak(t)-Bk(t)$ for k=1, 2, ..., n, each of which has been modified respectively with a signal that is out of phase by π/2 from a clock signal with an angular frequency of $\omega k$ for k=1 to n, and may apply the I-phase signal and the Q-phase signal on corresponding electrodes of each of the IQ-modulators.

In the optical modulation circuit of the present invention, the modulator drive signal generation unit may convert transmission data into four pieces of parallel data: $I1(t)$, $I2(t)$, $Q1(t)$, and $Q2(t)$, may generate: an I-phase signal in which a signal resulting from $Q2(t)-Q1(t)$ modified with a clock signal with an angular frequency of $\omega$ is added to a signal resulting from $I1(t)-I2(t)$ modified with a signal that is out of phase by π/2 from the clock signal; and a Q-phase signal in which a signal resulting from $I1(t)+I2(t)$ modified with a clock signal with an angular frequency of $\omega$ is added to a signal resulting from $Q2(t)+Q1(t)$ modified with a signal that is out of phase by π/2 from the clock signal, and may apply the I-phase signal and the Q-phase signal on corresponding electrodes of each of the IQ-modulators.

Furthermore, another aspect of the present invention can be an optical transmission system comprising: an optical transmitter comprising an optical modulation circuit of the present invention; an optical transmission path which transmits an optical subcarrier emitted from the optical transmitter; and an optical receiver which converts the optical subcarrier having been transmitted over the optical transmission path into an electrical signal.

At this time, the optical receiver may comprise Mach-Zehnder interferometer filters connected in multiple stages, optical couplers, and photoelectric converters. Alternatively, the optical receiver may comprise the Mach-Zehnder interferometer (MZI) filters connected in multiple stages, the optical couplers, optical gate circuits, and the photoelectric converters.

Furthermore, seeing the present invention from an aspect of an optical modulation method, the present invention is an optical modulation method in which an optical modulation circuit: generates continuous light with a constant power from a continuous light source; modulates data to be transmitted into modulator drive signals such as to generate optical subcarriers which have m (m≧1) and l (l≧1) (in total, l+m) different frequencies respectively before and after a frequency of the continuous light and on which different data is superimposed, by a modulator drive signal generation unit; and modulates the continuous light from the continuous light source into the optical subcarriers using the modulator drive signals, by an optical modulation unit.

ADVANTAGEOUS EFFECTS

According to the present invention, it is possible to implement multicarrier transmission capable of reducing the number of oscillators and the drive frequency that are required in generation of optical subcarriers to half or less those of the conventional one, capable of narrowing an occupied band, and capable of suppressing a chromatic dispersion and a PMD, and an influence of a nonlinear optical effect.

Figure 1:
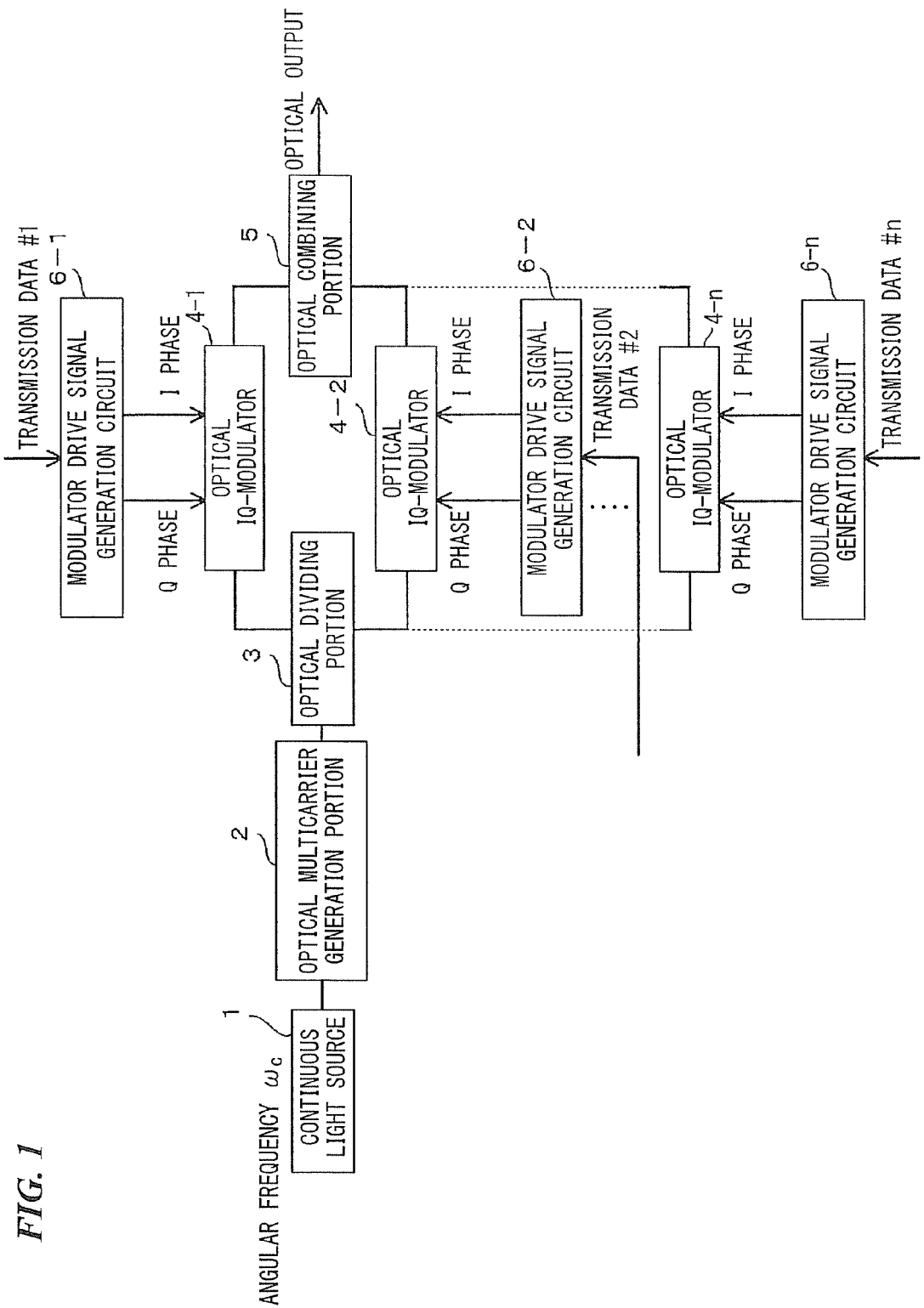
FIG. 1 is a configuration diagram showing an optical modulation circuit of a first embodiment.

EXPLANATION OF REFERENCE 1 continuous light source
2 optical multicarrier generation portion
3 optical dividing portion
4, 4-1 to 4-$n$ optical IQ-modulator
5 optical combining portion
6, 6-1 to 6-$n$ modulator drive signal generation circuit
10 serial/parallel converter
11, 11-1 to 11-$n$ arithmetic circuit
12, 12-1 to 12-$n$ oscillator
20 optical transmitter
30 optical transmission path
40 optical receiver
    41-1 to 41-11 Mach-Zehnder interferometer filter
42-1 to 42-4 optical coupler
43-1 to 43-8 balanced O/E converter
44-1, 44-2 parallel/serial converter
45-1 to 45-4 optical gate circuit
46-1 to 46-8 optical coupler
47-1 to 47-4 local oscillator light source
48-1 to 48-4 90° phase shifter

BEST MODE FOR CARRYING OUT THE INVENTION

First Embodiment

An optical modulation circuit using a multi-wavelength light source as a first embodiment of the present invention will be described with reference to FIG. 1 to FIG. 4B.

In the present embodiment, the multi-wavelength light source is made of a continuous light source 1 and an optical multicarrier generation portion 2.

FIG. 1 is a diagram showing a configuration of the optical modulation circuit of the present embodiment. As shown in FIG. 1, the optical modulation circuit of the present embodiment includes: a continuous light source 1 for outputting continuous light with an angular frequency of $\omega c$ with a constant power; an optical multicarrier generation portion 2 for generating n (n≧2) optical multicarriers from an optical carrier emitted from the continuous light source 1; an optical dividing portion 3 for dividing the optical multicarriers according to their wavelength; optical IQ-modulators 4-1 to 4-$n$ for generating optical subcarriers in which phase-shift keying is superimposed on the respective divisions of the optical multicarrier; an optical combining portion 5 for combining the optical subcarriers that have been divided and modulated; and modulator drive signal generation circuits 6-1 to 6-$n$ for generating a modulator drive signal from data.

Here, the present embodiment is characterized in that a multi-wavelength light source is used to generate an optical multicarrier. Thereby, compared with the case of generating the same number of optical subcarriers with the same bit-rate without using a multi-wavelength light source, a bit rate and a band of a signal generated by a single optical IQ-modulator is made small. Consequently, it is possible to relax requirements such as an electric circuit speed of the modulator drive signal generation circuits 6-1 to 6-$n$ and an operating band of the optical IQ-modulators 4-1 to 4-$n$.

Next is a description of an operation of the first embodiment. For convenience' sake, the description is for the case where the number of optical multicarriers emitted from the multi-wavelength light source is n=2 and the number of optical subcarriers generated by the optical IQ-modulator is l+m=2, that is, for the case where the total number of optical subcarriers generated is n×(1+m)=4, by way of example.

Figure 2:
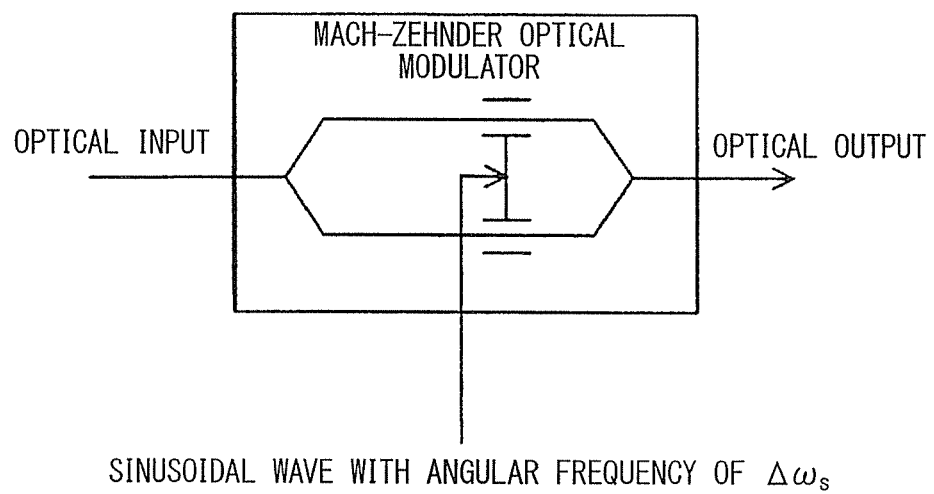
FIG. 2 is a configuration diagram showing an optical multicarrier generation portion of the first embodiment.

It is assumed that each bit rate of data #1 and data #2 to be transmitted is B (b/s). A variable $\omega c$ denotes an angular frequency of the optical carrier emitted from the continuous light source 1. A variable $\Delta\omega s$ denotes a difference in angular frequency between the optical carrier and the optical multicarrier generated by a Mach-Zehnder optical modulator as shown in FIG. 2. The following description is for the case where the frequency spacing between the optical subcarriers is equal to the symbol rate of the optical subcarriers. At this time, the relation $\Delta\omega s = 2\Delta\omega$ is satisfied.

The Mach-Zehnder optical modulator is used to push-pull drive and modulate the light emitted from the continuous light source 1 at a minimum bias point by means of a clock signal which is a sinusoidal wave with an angular frequency of $\Delta\omega s$. Thereby, the optical carriers with an angular frequency of $\omega c$ is suppressed. As a result, two optical multicarrier to which a double-sideband with carrier suppression modulation is imparted are generated as shown in Equation 1. This optical signal is put as s(t).

(Equation 1)

$$s(t) = \cos(\omega c)t \cdot \cos(\Delta\omega s)t \qquad (1)$$
$$= \cos(\omega c + \Delta\omega s)t + \cos(\omega c - \Delta\omega s)t$$

The optical signal s(t) is divided into (Equation 2)

$$s1(t) = \cos(\omega c + \Delta\omega s)t \qquad (2)$$

and (Equation 3)

$$s2(t) = \cos(\omega c - \Delta\omega s)t \qquad (3)$$

by the optical dividing portion 3. Here, s1 is input to the optical IQ-modulator 4-1, and s2 is input to the optical IQ-modulator 4-2.

Figure 3:
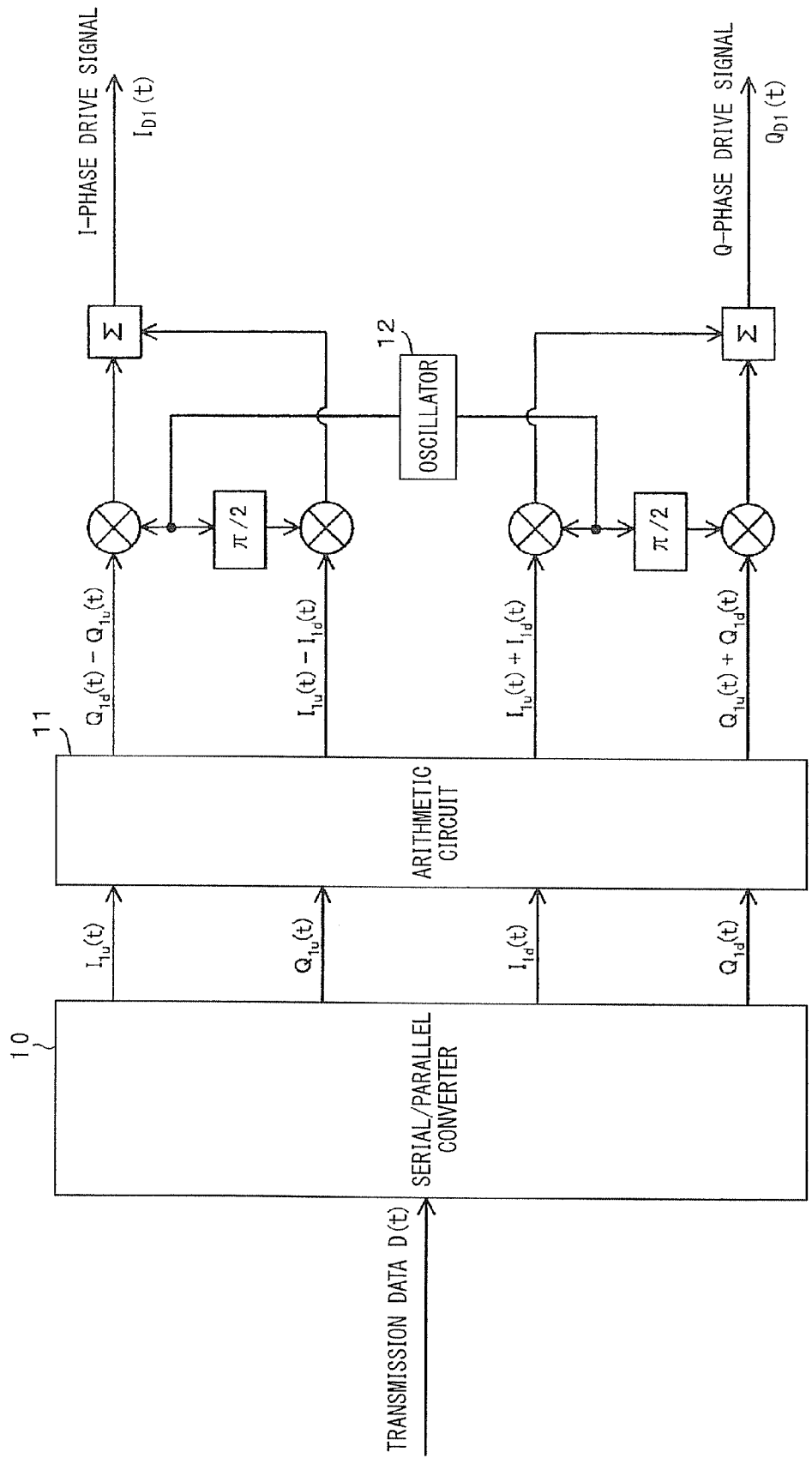
FIG. 3 is a configuration diagram showing a modulator drive signal generation circuit of the first embodiment.

Next is a description of an operation of the optical IQ-modulator 4-1. The modulator drive signal generation circuit 6-1 has a configuration as shown in FIG. 3. Allowing the data to be input as D1($t$), D1($t$) is divided into four pieces of parallel data: I1$u$($t$), I1$d$($t$), Q1$u$($t$), and Q1$d$($t$) by a serial/parallel converter 10.

The divided signals are transformed into four outputs: I1$u$($t$)+I1$d$($t$), I1$u$($t$)−I1$d$($t$), Q1$u$($t$)+Q1$d$($t$), and, Q1$d$($t$)−Q1$u$($t$) by an arithmetic circuit 11. They are modulated pairwise by a sinusoidal wave with an angular frequency of $\Delta\omega$ that has been emitted from an oscillator 12 and by a sinusoidal wave with a $\pi/2$ phase delay, respectively. The modulated outputs are added and output as ID1($t$) and QD1($t$), which are respectively expressed as Equation 4 and Equation 5.

(Equation 4)
$$ID1(t) = (Q1d(t) - Q1u(t))\cos\Delta\omega t + (I1u(t) - I1d(t))\sin\Delta\omega t \quad (4)$$

(Equation 5)
$$QD1(t) = (I1u(t) + I1d(t))\cos\Delta\omega t + (Q1u(t) + Q1d(t))\sin\Delta\omega t \quad (5)$$

When the optical IQ-modulator 4-1 is driven with these signals, an optical signal that is output from the optical IQ-modulator 4-1 is generated as an output signal S1($t$). The output signal S1($t$) is an optical subcarrier in which phase-shift keying is superimposed on angular frequencies of $\pm\Delta\omega$ from an angular frequency $\omega c+\Delta\omega s$ of the optical carrier of s1($t$), which is expressed as Equation 6.

(Equation 6)
$$S1(t) = I1u(t)\cos(\omega c + \Delta\omega s + \Delta\omega)t - Q1u(t)\sin(\omega c + \Delta\omega s + \Delta\omega)t + I1d(t)\cos(\omega c + \Delta\omega s - \Delta\omega)t + Q1d(t)\sin(\omega c + \Delta\omega s - \Delta\omega)t \quad (6)$$

Similarly, an output signal S2($t$) of the optical IQ-modulator 4-2 is expressed as Equation 7.

(Equation 7)
$$S2(t) = I2u(t)\cos(\omega c - \Delta\omega s + \Delta\omega)t - Q2u(t)\sin(\omega c - \Delta\omega s + \Delta\omega)t + I2d(t)\cos(\omega c - \Delta\omega s - \Delta\omega)t + Q2d(t)\sin(\omega c - \Delta\omega s - \Delta\omega)t \quad (7)$$

Figure 4A:
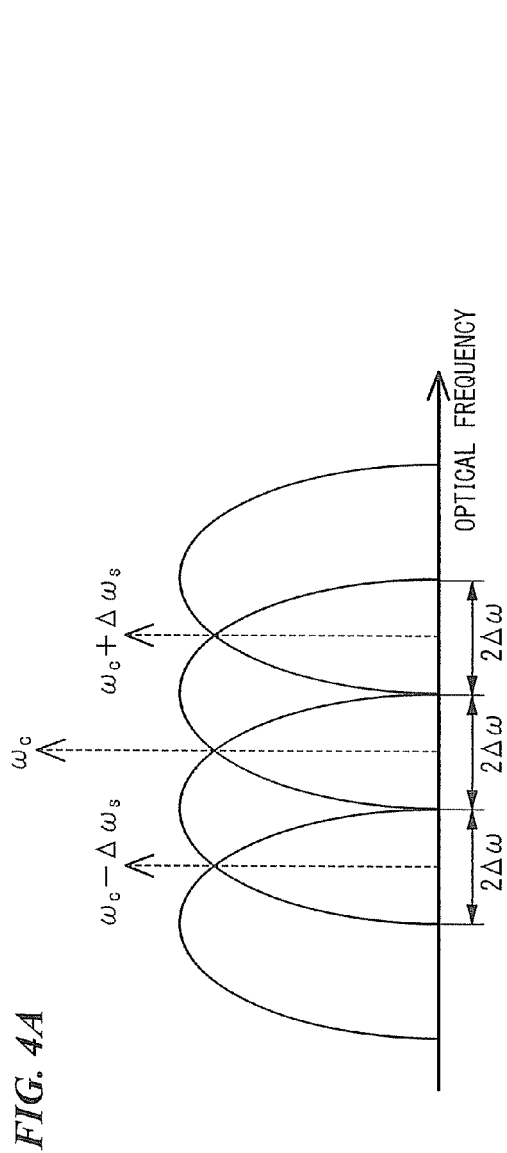
FIG. 4A is a diagram showing an output spectrum of the optical modulation circuit of the first embodiment.

S1 and S2 that have been output respectively from the optical IQ-modulators 4-1 and 4-2 are combined by the optical combining portion 5. The resultant signal is then output from the optical modulation circuit, with a spectrum as shown in FIG. 4A. As shown in FIG. 4A, according to the present invention, the signal band is narrowed more than in single carrier transmission, and also the symbol rate for a single subcarrier is lowered. Therefore, chromatic dispersion and PMD tolerances improve. Furthermore, precoding the input date makes it possible to superimpose a differential phase-shift keying code.

For convenience' sake, the description above has been for the case where the number of optical multicarriers emitted from the multi-wavelength light source is two, by way of example. However, in the more general case where the number of optical multicarrier is n, the output signal is expressed as Equation 8.

(Equation 8)
$$Sk(t) = Iku(t)\cos(\omega k + \Delta\omega)t - Qku(t)\sin(\omega k + \Delta\omega)t + Ikd(t)\cos(\omega k - \Delta\omega)t + Qkd(t)\sin(\omega k - \Delta\omega)t \quad (8)$$

where $\omega k$ denotes an angular frequency of the optical multicarrier that has been output from the multi-wavelength light source. An $\omega k$ satisfies Equation 9, where l, m (l, m≦n) are variant integers.

(Equation 9)
$$|\omega l - \omega m| = 4|l - m|\Delta\omega \quad (9)$$

Figure 4B:
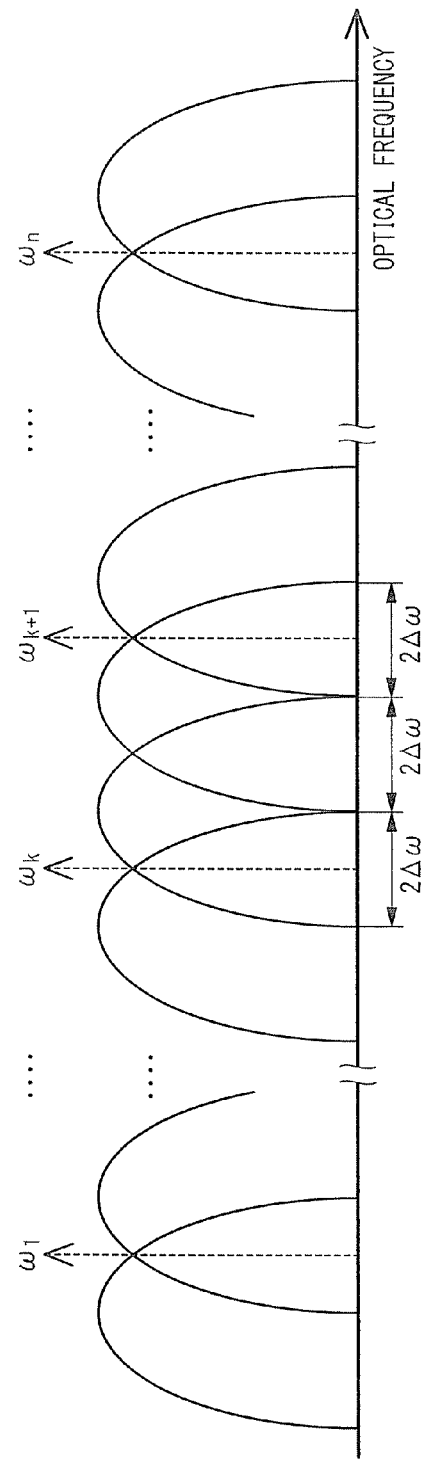
FIG. 4B is a diagram showing an output spectrum of the optical modulation circuit of the first embodiment.

In this case, S1 to Sn that have been output respectively from the optical IQ-modulators 4-1 to 4-n are combined by the optical combining portion 5. The resultant signal is then output from the optical modulation circuit, with a spectrum as shown in FIG. 4B.

Furthermore, if the optical multicarrier generation portion has a configuration in which, instead of a Mach-Zehnder modulator, a phase-shift modulator is driven with a sinusoidal wave with an angular frequency of $\Delta\omega s$, it is possible to generate three optical multicarriers: $\omega c$, $\omega c+\Delta\omega s$, and $\omega c-\Delta\omega s$. In addition, if the phase-shift modulator and the intensity modulator are serially connected and driven with synchronized clock signals, it is possible to generate n optical multicarriers.

Second Embodiment

A second embodiment of the present invention will be described with reference to FIG. 5 to FIG. 8. In the present embodiment, the description is for the case where the distance between the optical subcarriers is equal to the symbol rate of the optical subcarriers.

Figure 5:
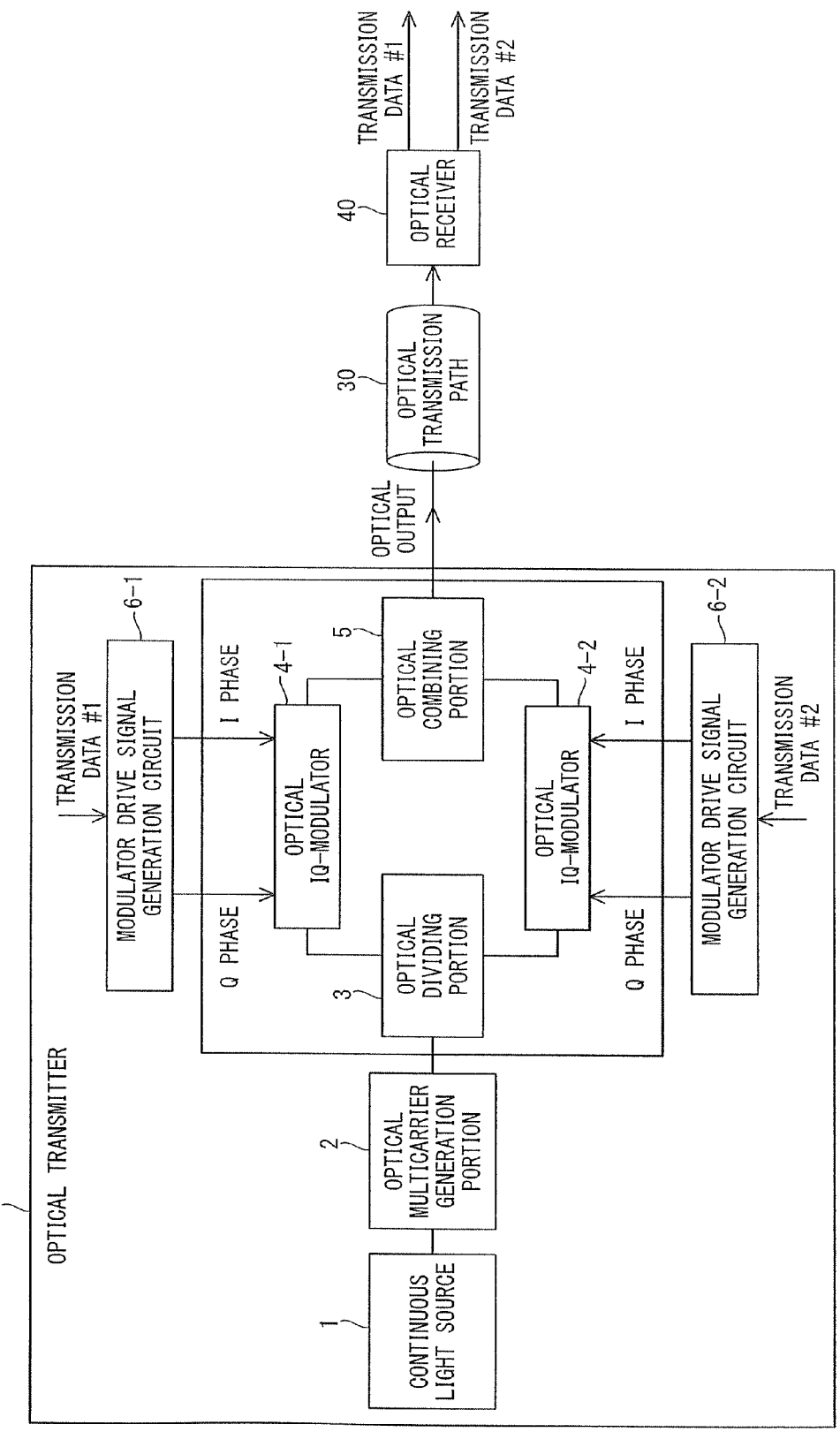
FIG. 5 is a configuration diagram showing an optical transmission system of a second embodiment.

FIG. 5 is a diagram showing a configuration of an optical transmission system of the present embodiment. The optical IQ-modulators 4-1 and 4-2, the optical multicarrier generation portion 2, and the modulator drive signal generation circuit 6-1 and 6-2 in the optical transmitter 20 of the present embodiment are configured similarly to those in the first embodiment, which are shown in FIG. 1 and FIG. 3. In this configuration, it is possible to superimpose phase-shift keying on each optical subcarrier. In the present embodiment, quaternary differential phase-shift keying (DQPSK) is employed.

It is assumed that the bit rate of the data #1 and the data #2 that are respectively input to the modulator drive signal generation circuits 6-1 and 6-2 is B (b/s). Therefore, data with 2B (b/s) in total is transmitted. The optical subcarrier signal that has been output from the optical transmitter 20 propagates through an optical transmission path 30 and is input to an optical receiver 40.

Similarly to the first embodiment, signals parallelized from the data #1 by the serial/parallel converter 10 are denoted as I1$u$($t$), I1$d$($t$), Q1$u$($t$), and Q1$d$($t$). Signals parallelized from the data #2 by the serial/parallel converter 10 are denoted as I2$u$($t$), I2$d$($t$), Q2$u$($t$), and Q2$d$($t$). In the present embodiment, $\Delta\omega s=B/4$ (Hz).

Figure 6:
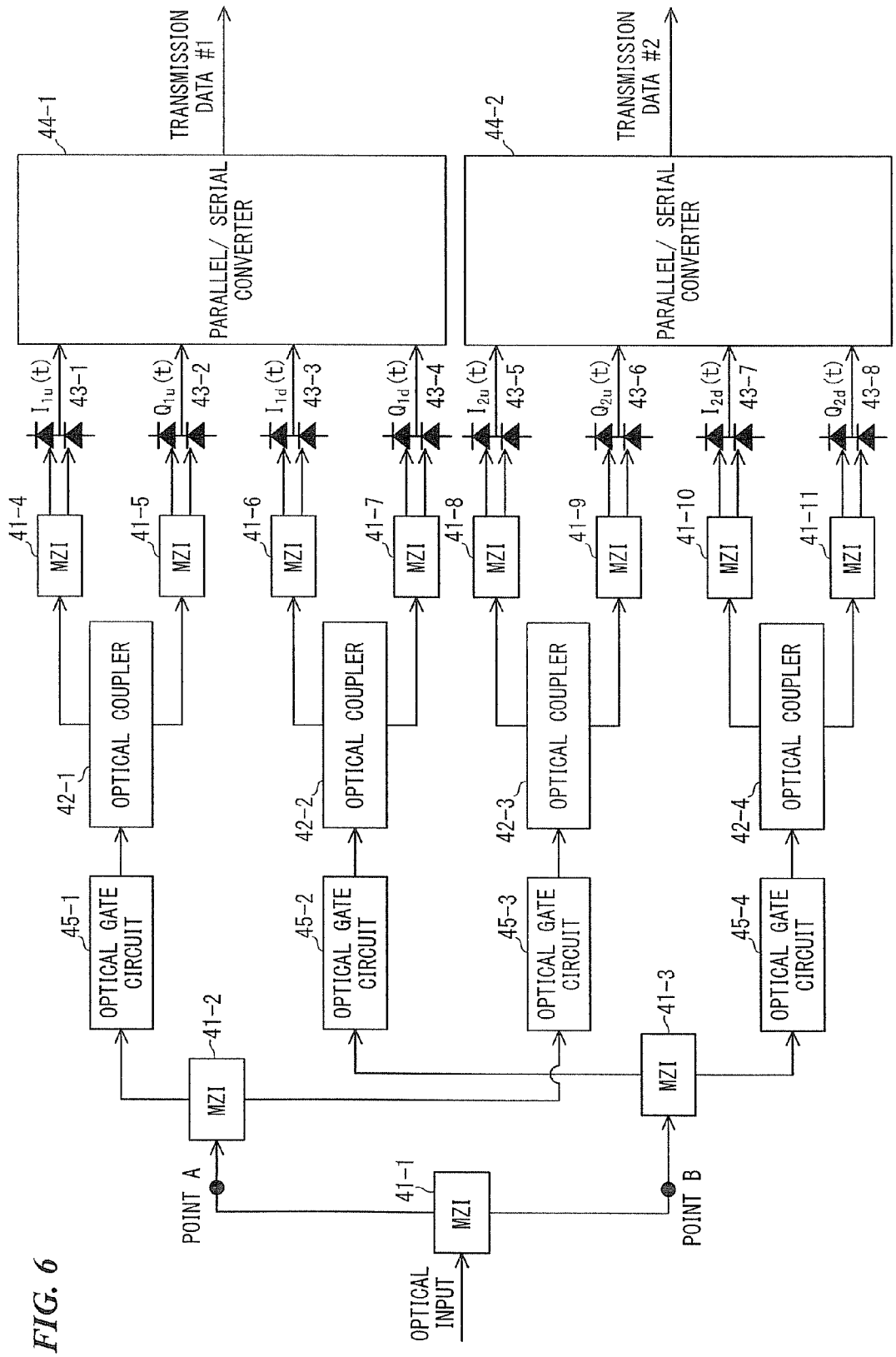
FIG. 6 is a configuration diagram showing an optical receiver of the second embodiment.
Figure 7A:
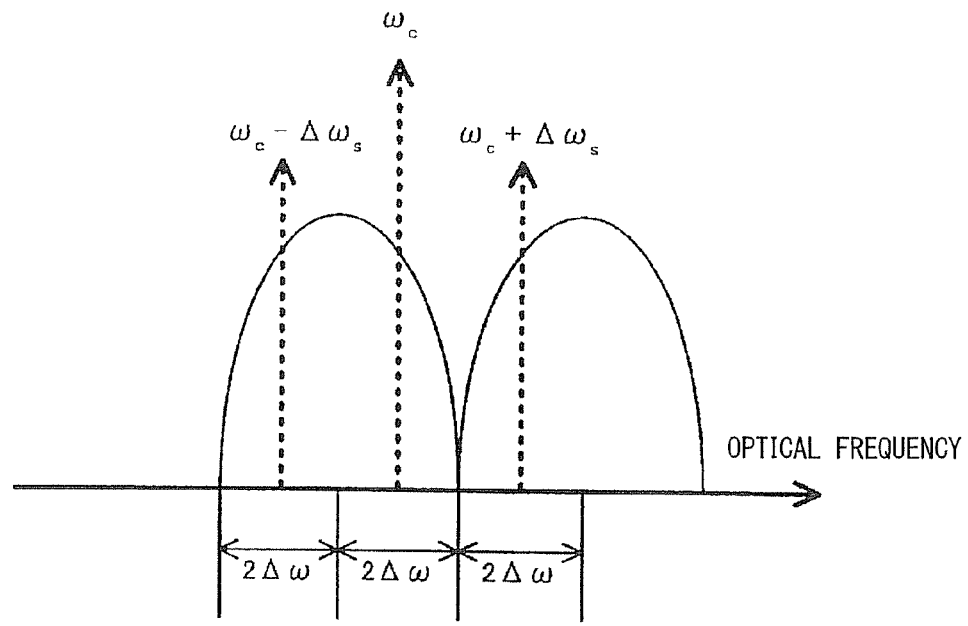
FIG. 7A is a diagram showing a spectrum of an optical signal after passing through an MZI of the second embodiment.
Figure 7B:
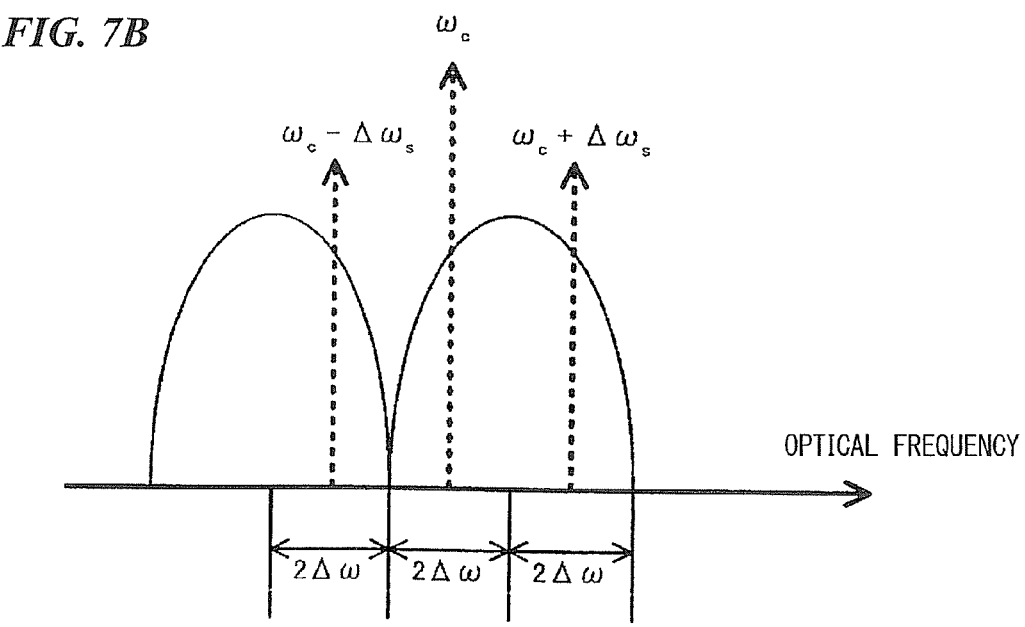
FIG. 7B is a diagram showing a spectrum of an optical signal after passing through the MZI of the second embodiment.

As shown in FIG. 6, the optical receiver 40 is made of: Mach-Zehnder interferometer filters (MZIs) 41-1 to 41-11 with a free spectral range (FSR) of one of B/2 (Hz), B (Hz), and B/4 (Hz); optical branching portions 42-1 to 42-4; and balanced O/E converters 43-1 to 43-8. An optical signal that has been input to the optical receiver 40 is first divided into two pairs of subcarriers by the MZI 41-1 with an FSR of B/2, as shown in FIG. 7A and FIG. 7B. FIG. 7A shows a spectrum at point A in FIG. 6. FIG. 7B shows a spectrum at point B in FIG. 6.

Next, the optical signal is input to the MZIs 41-2 and 41-3 with an FSR of B (Hz), where the adjacent optical subcarriers are separated. Furthermore, each optical subcarrier is divided into two optical signals with a half power respectively by the optical branching portions 42-1 to 42-4. Each of the divided optical subcarriers is then input respectively to the MZIs 41-4 to 41-11 with an FSR of B/4 (Hz). Thereby, a 1-bit delay is imparted to each optical subcarrier. The optical subcarriers are then converted into pieces of binary data $I1u(t)$, $I1d(t)$, $Q1u(t)$, $Q1d(t)$, $I2u(t)$, $I2d(t)$, $Q2u(t)$, and $Q2d(t)$ respectively by the balanced O/E converters 43-1 to 43-8.

The pieces of binary data are demodulated into the original data #1 and the original data #2 by the parallel/serial converters 44-1 and 44-2.

Here, the present embodiment is characterized in that, because the distance between the optical subcarriers and the symbol rate of the optical subcarriers take the same orthogonal state, it is possible to separate and detect optical subcarriers without receiving linear interference and that the operating band of the necessary electrical/optical circuit are relaxed compared with those of single-carrier transmission.

Furthermore, if optical gate circuits 45-1 to 45-4, which have been driven with a sinusoidal wave with the same frequency as the symbol rate for a single optical subcarrier, are inserted directly before the optical couplers 42-1 to 42-4 respectively, it is possible to suppress interference, thus improving transmission quality.

In the case where QPSK is superimposed on each optical subcarrier instead of DQPSK, it is not possible to perform a differential detection. Therefore, instead of performing a differential detection by use of the MZIs 41-4 to 41-11 with a 1-bit delay, the optical subcarriers are received after they are mixed with local oscillator light (local light) with a frequency substantially equal to that of the optical subcarriers. Thereby, it is possible to demodulate the optical subcarriers.

Figure 8:
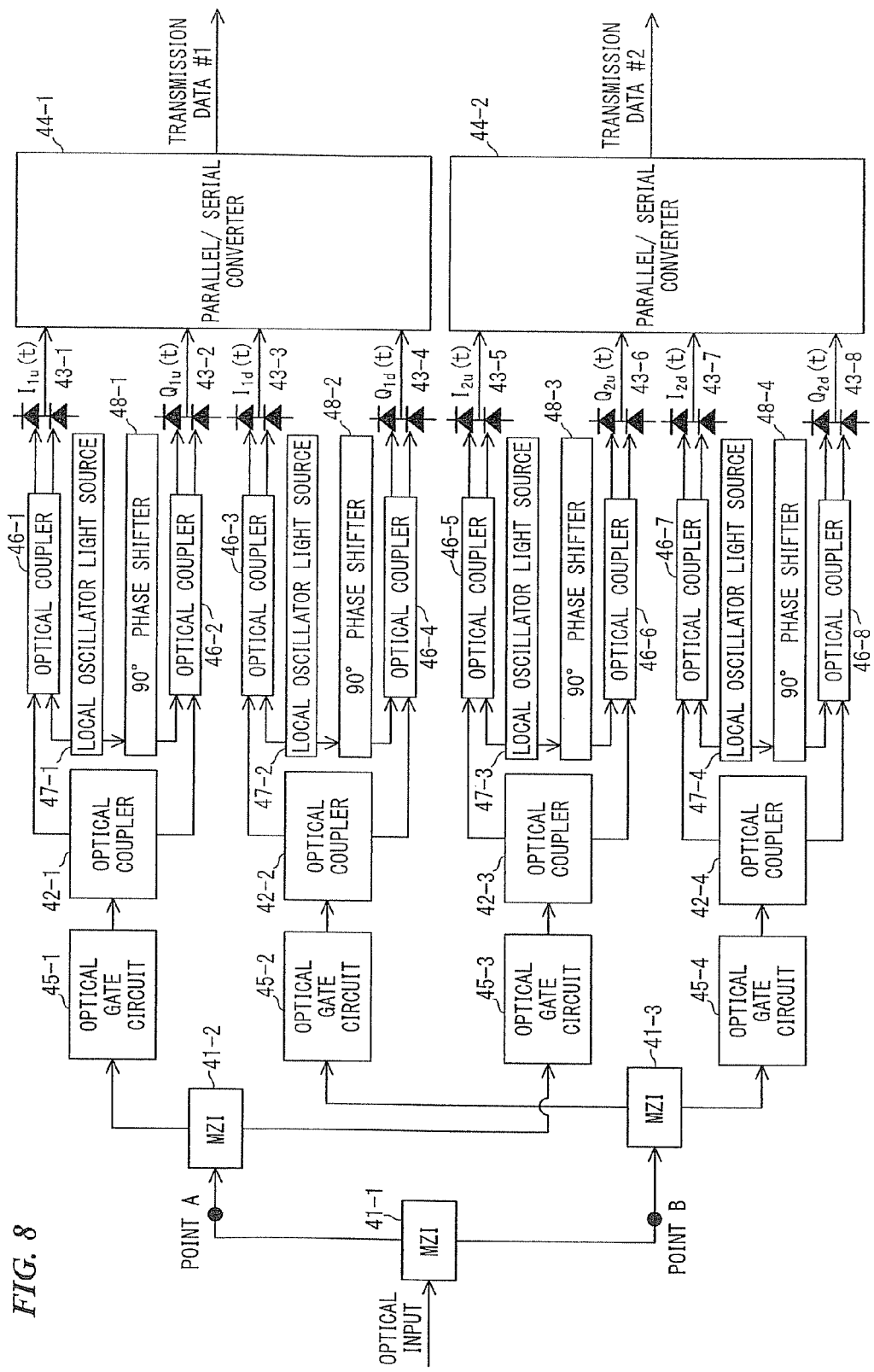
FIG. 8 is a configuration diagram showing an optical receiver applied to a QPSK of the second embodiment.

As for a specific configuration therefor, optical couplers 46-1 to 46-8 are provided instead of the MZIs 41-4 to 41-11 with a 1-bit delay, as shown in FIG. 8. By use of local oscillator light sources 47-1 to 47-4 and 90° phase shifters 48-1 to 48-4, two beams of local oscillator light whose phases are 90° different from each other are mixed with the two branched optical subcarriers, respectively. Thereby, it is possible to perform a heterodyne or homodyne detection on each channel by use of local oscillator light.

Third Embodiment

An optical modulation circuit of a third embodiment of the present invention will be described with reference to FIG. 9 and FIG. 10. In the second embodiment, the description has been for the case where a plurality of optical subcarriers on which differential phase-shift keying (DQPSK) is employed are generated. However, in the third embodiment, the case where phase-shift keying is superimposed on a plurality of optical subcarriers will be described.

Figure 9:
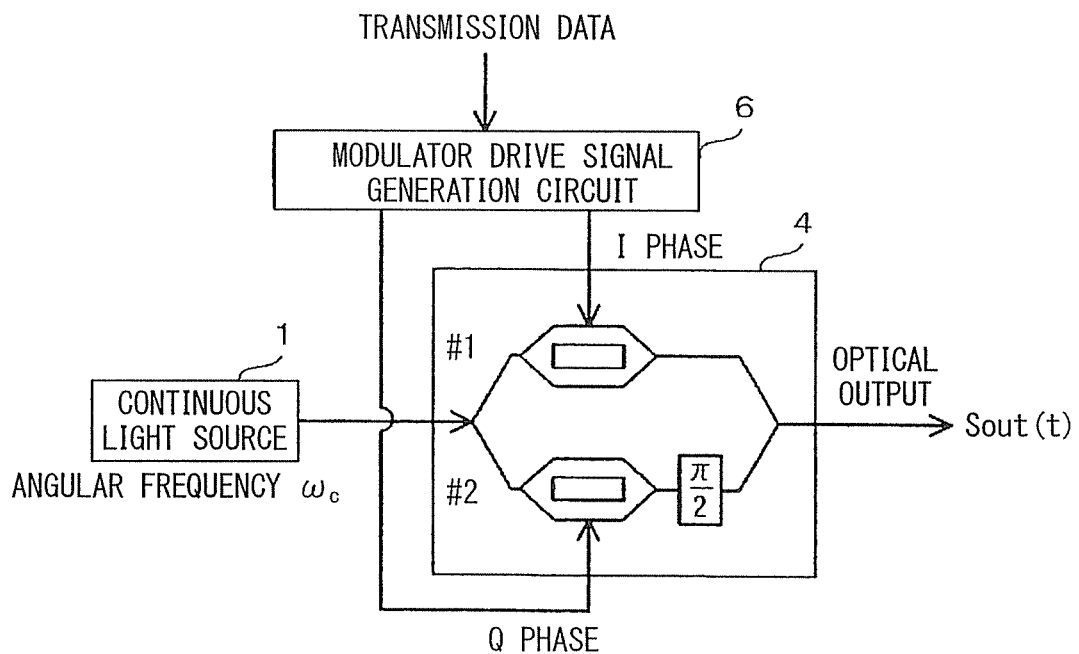
FIG. 9 is a configuration diagram showing an optical modulation circuit of a third embodiment.

The optical modulation circuit of the third embodiment has a configuration that includes: a continuous light source 1 for outputting continuous light with a constant power; an optical IQ-modulator 4 for generating subcarriers on which phase-shift keying is employed; and a modulator drive signal generation circuit 6 for generating a modulator drive signal from data, as shown in FIG. 9. A configuration of the modulator drive signal generation circuit 6 is shown in FIG. 10.

An optical carrier with an angular frequency of $\omega c$ emitted from the continuous light source 1 is incident on the optical IQ-modulator 4, and is divided into two paths #1 and #2. A signal in the path #1 is modulated with a drive signal I(t) expressed by Equation 10. A signal in the path #2 is modulated with a drive signal Q(t) expressed by Equation 11. The drive signals I(t) and Q(t) are generated by the modulator drive signal generation circuit 6.

Here, the data superimposed on an upper sideband of the optical carrier is denoted by an adscript u. The data superimposed on a lower sideband of the optical carrier is denoted by an adscript d. For example, $I2u(t)$ denotes data of an in-phase component superimposed on the subcarrier with $\omega+2\Delta\omega$.

(Equation 10)

$$I(t) = \Sigma k = 1 \text{ to } m(Qkd(t) - Qku(t))\cos\Delta\omega kt + \Sigma k = 1 \text{ to } m(Iku(t) - Ikd(t))\sin\Delta\omega kt \quad (10)$$

(Equation 11)

$$Q(t) = \Sigma k = 1 \text{ to } m(Ikd(t) + Iku(t))\cos\Delta\omega kt + \Sigma k = 1 \text{ to } m(Qku(t) + Qkd(t))\sin\Delta\omega kt \quad (11)$$

Furthermore, to the signal in the path #2 is imparted a $\pi/2$ phase delay with respect to the optical carrier. Therefore, the combination of the optical signals in the two paths yields an output signal Sout(t) expressed by Equation 12.

(Equation 12)

$$Sout(t) = \Sigma k = 1 \text{ to } mIku(t)\cos(\omega c + \Delta\omega k)t - \Sigma k = 1 \text{ to } mQku(t)\sin(\omega c + \Delta\omega k)t + \Sigma k = 1 \text{ to } mIkd(t)\cos(\omega c - \Delta\omega k)t + \Sigma k = 1 \text{ to } mQkd(t)\sin(\omega c - \Delta\omega k)t \quad (12)$$

As described above, 2m optical subcarriers on which phase-shift keying is superimposed are generated with the angular frequency $\omega c$ of the optical carrier emitted from the continuous light source 1 at their center. According to the present invention, the signal band is more narrowed than in single carrier transmission. In addition, the symbol rate for a single subcarrier is lowered. Therefore, chromatic dispersion and PMD tolerances improve. Furthermore, in the present embodiment, Iku and Qku may be in a signal constellation of quadrature amplitude modulation (QAM).

Fourth Embodiment

Figure 10:
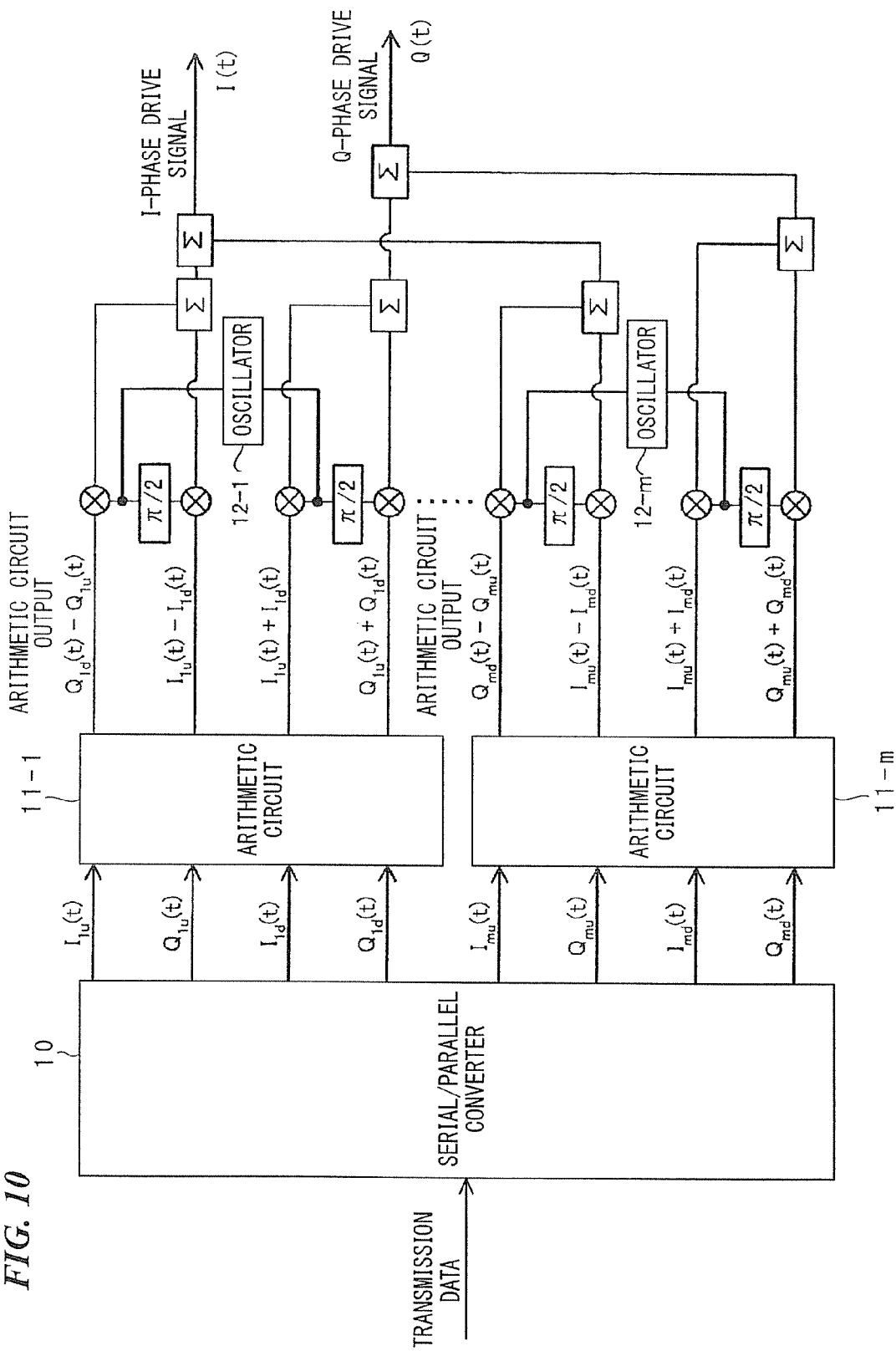
FIG. 10 is a configuration diagram showing an optical modulation circuit drive signal generation portion of the third embodiment.
Figure 11A:
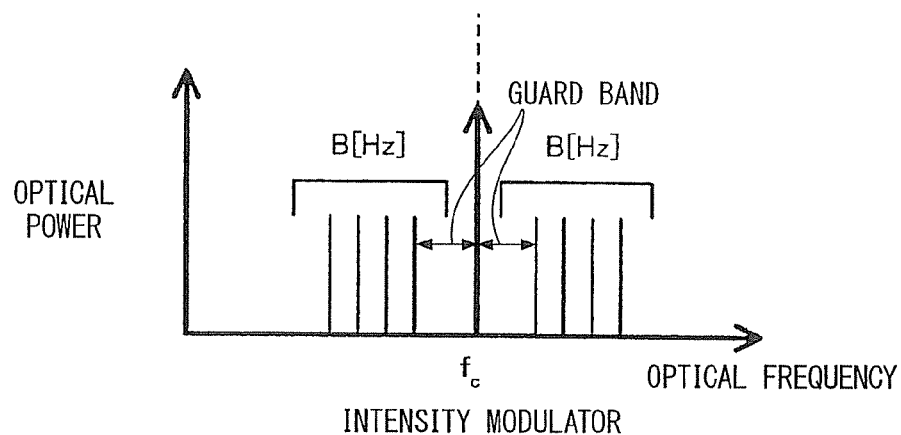
FIG. 11A is a diagram showing an optical spectrum in a conventional modulation scheme.
Figure 11B:
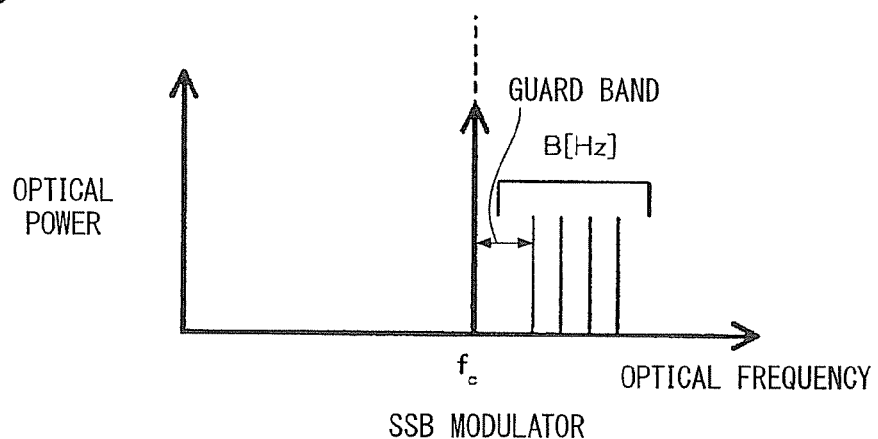
FIG. 11B is a diagram showing an optical spectrum in a conventional modulation scheme
Figure 11C:
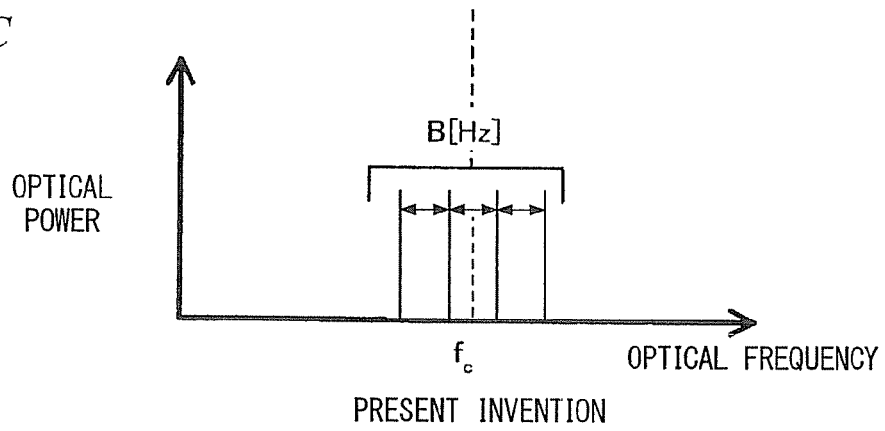
FIG. 11C is a diagram showing an optical spectrum in an optical modulation circuit of the present invention.

In the same configuration as that of the optical modulation circuit, as shown in FIG. 1, described in the first embodiment, the circuit configurations corresponding to the modulator drive signal generation circuits 6-1 and 6-2 are each replaced with the circuit configuration for generating a plurality of optical subcarriers, as shown in FIG. 10, described in the third embodiment. With the adjustment of the number of carriers generated by the optical multicarrier generation portion 2 and the optical IQ-modulators 4-1 and 4-2, it is possible to generate an optional number of optical subcarriers with the frequency of the optical carrier of the continuous light source 1 at their center.

Fifth Embodiment

With the optical modulation circuit described in the fourth embodiment, an optical receiver as shown in FIG. 6 made of Mach-Zehnder interferometer filters connected in multiple stages, optical couplers, and photoelectric converters is used. Thereby, it is possible to constitute an optical transmission system in which intensity modulation or phase-shift keying is superimposed on an optional number of optical subcarriers.

Furthermore, an optical gate circuit that has been driven with a sinusoidal wave with the same frequency as the symbol rate for a single optical subcarrier may be inserted directly before each optical branching portion.

INDUSTRIAL APPLICABILITY

According to the present invention, it is possible to implement multicarrier transmission capable reducing the number of oscillators and the operating frequency of the electrical/optical circuit that are required in generation of optical subcarriers to half or less those of the conventional one, capable of narrowing an occupied band, and capable of suppressing a chromatic dispersion and a PMD, and an influence of a non-linear optical effect. Therefore, it is possible to reduce the amount of hardware when an optical transmission system is constructed, and also to improve communication quality.

The invention claimed is:

1. An optical modulation circuit comprising:
a continuous light source which generates continuous light having n (n≧2) different frequencies with phase synchronization and a constant power, wherein n is an integer;
a modulator drive signal generation unit which modulates data to be transmitted into modulator drive signals such as to generate optical subcarriers which have m (m≧1) and l (l≧1) (in total, l+m) different frequencies respectively before and after a frequency of the continuous light and on which different data is superimposed; and
an optical modulation unit which modulates the continuous light from the continuous light source into the optical subcarriers using the modulator drive signals.

2. The optical modulation circuit of claim 1, comprising:
an optical multicarrier generation unit which generates optical multicarriers with n (n≧2) different frequencies based on the continuous light from the continuous light source;
an optical dividing unit which divides the optical multicarrier for each of the n different frequencies so as to output n optical carriers; and
an optical combining unit connected to the optical modulation unit,
wherein the modulator drive signal generation unit modulates data to be transmitted into n of the modulator drive signals such as to generate optical subcarriers which further have the m (m≧1) and l (l≧1) (in total, l+m) different frequencies respectively before and after each of the frequencies of the n optical carriers and on which different data is superimposed,
the modulation unit uses the n modulator drive signals to further modulate the n optical carriers into l+m of the optical subcarriers, and
the optical combining unit combines a total of n×(l+m) of the optical subcarriers.

3. The optical modulation circuit of claim 2, wherein the optical modulation unit comprises n optical IQ-modulators.

4. The optical modulation circuit of claim 3, wherein the modulator drive signal generation unit converts transmission data into two pieces of parallel data: A(t) and B(t),
generates an I-phase signal resulting from A(t)+B(t) modified with a clock signal with an angular frequency of ω and a Q-phase signal resulting from A(t)−B(t) modified with a signal that is out of phase by π/2 from the clock signal, and
applies the I-phase signal and the Q-phase signal on corresponding electrodes of each of the optical IQ-modulators.

5. The optical modulation circuit of claim 3, wherein the modulator drive signal generation unit converts transmission data into 2n pieces of parallel data of A1(t), A2(t), ..., An(t) and B1(t), B2(t), ..., Bn(t),
generates an I-phase signal resulting from adding the 2n pieces of parallel data for k=1 to n, which have been modified respectively with n clock signals with angular frequencies of ω1, ω2, ..., ωn and a Q-phase signal resulting from adding Ak(t)−Bk(t) for k=1, 2, ..., n, each of which has been modified respectively with a signal that is out of phase by π/2 from a clock signal with an angular frequency of ωk for k=1 to n, and
applies the I-phase signal and the Q-phase signal on corresponding electrodes of each of the IQ-modulators.

6. The optical modulation circuit of claim 3, wherein the modulator drive signal generation unit converts transmission data into four pieces of parallel data: I1(t), I2(t), Q1(t), and Q2(t),
generates: an I-phase signal in which a signal resulting from Q2(t)-Q1(t) modified with a clock signal with an angular frequency of w is added to a signal resulting from I1(t)-I2(t) modified with a signal that is out of phase by π/2 from the clock signal; and a Q-phase signal in which a signal resulting from I1(t)+I2(t) modified with a clock signal with an angular frequency of w is added to a signal resulting from Q2(t)+Q1(t) modified with a signal that is out of phase by π/2 from the clock signal, and
applies the I-phase signal and the Q-phase signal on corresponding electrodes of each of the IQ-modulators.

7. The optical modulation circuit of claim 2, wherein the optical multicarrier generation unit imparts a double-sideband with carrier suppression modulation by a sinusoidal wave to the continuous light source.

8. The optical modulation circuit of claim 1, wherein the modulator drive signal generation unit generates the modulator drive signal which superimposes phase-shift keying, intensity modulation, or quadrature amplitude modulation for every frequency of the optical subcarriers.

9. The optical modulation circuit of claim 1, wherein the symbol rate of the optical subcarriers equals to the distance between the optical subcarriers.

10. An optical transmission system comprising:
an optical transmitter comprising an optical modulation circuit of claim 1;
an optical transmission path which transmits an optical subcarrier emitted from the optical transmitter; and
an optical receiver which converts the optical subcarrier having been transmitted over the optical transmission path into an electrical signal.

11. The optical transmission system of claim 10, wherein the optical receiver comprises Mach-Zehnder interferometer filters connected in multiple stages, optical couplers, and photoelectric converters.

12. The optical transmission system of claim 11, wherein the optical receiver comprises the Mach-Zehnder interferometer filters connected in multiple stages, the optical couplers, optical gate circuits, and the photoelectric converters.

13. An optical modulation method in which an optical modulation circuit:
generates continuous light having n (n>2) different frequencies with phase synchronization and a constant power, wherein n is an integer; from a continuous light source;
modulates data to be transmitted into modulator drive signals such as to generate optical subcarriers which have m (m≧1) and l(l≧1) (in total, l+m) different frequencies respectively before and after a frequency of the continuous light and on which different data is superimposed, by a modulator drive signal generation unit; and
modulates the continuous light from the continuous light source into the optical subcarriers using the modulator drive signals, by an optical modulation unit.

14. An optical modulation circuit comprising:
a multiple-wavelength light source which generates continuous light having n (n≧2) different frequencies with phase synchronization and a constant power, wherein n is an integer;
an optical dividing unit which divides the continuous light in response to frequencies;
n optical orthogonal modulation units which generate optical subcarrier signals, in which the continuous light is divided by the optical dividing unit, and each of the n optical orthogonal modulation units receives the divided continuous light, divides the divided continuous light into two paths, modulates each of the divided continuous light of each path, performs phase-shift modulation by delaying one of the divided continuous light of one path by $\pi/2$ and combining with another one of the divided continuous light of another path, thereby generating the optical subcarrier signals;
an optical combining unit which combines the optical subcarrier signals of the n optical orthogonal modulation units;
a modulator drive signal generation unit which converts transmission data into drive signals of the optical orthogonal modulation units and outputs the drive signals to the n optical orthogonal modulation units,
wherein the modulator drive signal generation unit converts the transmission data into two pieces of parallel data: A(t) and B(t),
generates an I-phase signal resulting from A(t)+B(t) modulated with a clock signal with an angular frequency $\omega$ and a Q-phase signal resulting from A(t)−B(t) modulated with a signal that is out of phased by $\pi/2$ from the clock signal,
applies the I-phase signal and the Q-phase signal to corresponding electrodes of the paths of the optical orthogonal modulation units, and
generates optical subcarrier signals, wherein a center of frequencies of the optical subcarrier signals having a differential frequency $\Delta\omega$ corresponds to a frequency of an optical carrier.

15. The optical modulation circuit as claimed in claim 14, wherein a symbol rate of the optical subcarrier signals is the same as a distance between the optical subcarriers.

16. The optical modulation circuit as claimed in claim 14, wherein the multiple-wavelength light source comprises
a CW light source that emits continuous light having a constant power and an optical double-sideband modulation unit that performs double-sideband suppressed carrier modulation for the CW light source by use of a sine wave.

17. The optical modulation circuit as claimed in claim 14, wherein the modulator drive signal generation unit generates drive signals corresponding to the optical orthogonal modulation drive signals arranged in parallel, and inputs the drive signals to the n optical orthogonal modulation units so that any pieces of optical subcarrier signals are generated.

18. An optical modulation circuit comprising:
a multiple-wavelength light source which generates continuous light having n (n≧2) different frequencies with phase synchronization and a constant power, wherein n is an integer;
an optical dividing unit which divides the continuous light in response to frequencies;
n optical orthogonal modulation units which generate optical subcarrier signals, in which the continuous light is divided by the optical dividing unit, and
each of the n optical orthogonal modulation units receives the divided continuous light, divides the divided continuous light into two paths, modulates each of the divided continuous light of each path, performs phase-shift modulation by delaying one of the divided continuous light of one path by $\pi/2$ and combining with another one of the divided continuous light of another path, thereby generating the optical subcarrier signals;
an optical combining unit which combines the optical subcarrier signals of the n optical orthogonal modulation units;
a modulator drive signal generation unit which converts transmission data into drive signals of the optical orthogonal modulation units and outputs the drive signals to the n optical orthogonal modulation units,
wherein the modulator drive signal generation unit converts the transmission data into 2n pieces of parallel data of A1(t), A2(t), . . . , An(t) and B1(t), B2(t), . . . , Bn(t),
modulates the parallel data with n clock signals with angular frequencies of $\omega 1, \omega 2, \ldots, \omega n$, and adds the modulated parallel data for k=1 to n, thereby generating an I-phase signal,
modulates Ak(t)−Bk(t) for k=1, 2, . . . , n with a signal that is out of phase by $\pi/2$ from a clock signal with an angular frequency $\omega k$ and adds the modulated Ak(t)−Bk(t) for k=1 to n, thereby generating a Q-phase signal, and
applies the I-phase signal and the Q-phase signal to corresponding electrodes of the paths of the optical orthogonal modulation units, and
generates optical subcarrier signals, wherein a center of frequencies of the optical subcarrier signals having a differential frequency $\Delta\omega$ corresponds to a frequency of an optical carrier.

19. An optical modulation circuit comprising:
a multiple-wavelength light source which generates continuous light having n (n≧2) different frequencies with phase synchronization and a constant power, wherein n is an integer;
an optical dividing unit which divides the continuous light in response to frequencies;
n optical orthogonal modulation units which generate optical subcarrier signals, in which the continuous light is divided by the optical dividing unit, and each of the n optical orthogonal modulation units receives the divided continuous light, divides the divided continuous light into two paths, modulates each of the divided continuous light of each path, performs phase-shift modulation by delaying one of the divided continuous light of one path by $\pi/2$ and combining with another one of the divided continuous light of another path, thereby generating the optical subcarrier signals;

an optical combining unit which combines optical subcarrier signals of the n optical orthogonal modulation units;

a modulator drive signal generation unit which converts transmission data into drive signals of the optical orthogonal modulation units and outputs the drive signals to the n optical orthogonal modulation units, wherein the modulator drive signal generation unit converts the transmission data into four pieces of parallel data: I1($t$), I2($t$), Q1($t$), and Q2($t$), modulates Q2($t$)−Q1($t$) with a clock signal with an angular frequency $\omega$, modulates I1($t$)−I2($t$) with a signal that is out of phase by $\pi/2$ from the clock signal and adds the modulated Q2($t$)−Q1($t$) and modulated I1($t$)−I2($t$) so as to generate an I-phase signal, modulates I1($t$)+I2($t$) with the clock signal with the angular frequency $\omega$, modulates Q2($t$)+Q1($t$) with the signal that is out of phase by $\pi/2$ from the clock signal and adds the modulated I1($t$)+I2($t$) and modulated Q2($t$)+Q1($t$) so as to generate a Q-phase signal, and applies the I-phase signal and the Q-phase signal to corresponding electrodes of the paths of the optical orthogonal modulation units, and generates optical subcarrier signals, wherein a center of frequencies of the optical subcarrier signals having a differential frequency $\Delta\omega$ corresponds to a frequency of an optical carrier.

20. An optical transmission system, comprising:

an optical transmission apparatus which includes an optical modulation unit as claimed in any one of claims 14, 18, or 19;

an optical transmission line which transmits an optical subcarrier signal transmitted from the optical transmission apparatus; and an optical receiver which includes an optoelectric conversion unit that converts the optical subcarrier signal transmitted through the optical transmission line into an electrical signal.

21. The optical transmission system as claimed in claim 20, wherein the optical receiver includes Mach-Zehnder interferometer filters connected in multiple stages and optical branching units.

22. The optical transmission system as claimed in claim 20, wherein
the optical receiver includes Mach-Zehnder interferometer filters connected in multiple stages, optical branching units and optical gate circuits.

23. An optical modulating method, comprising:

a step of generating continuous light having n (n≧2) different frequencies, phase synchronization and a constant power by a multiple-wavelength light source, wherein the n is an integer;

a step of dividing the continuous light in response to frequencies by an optical dividing unit;

a step of generating optical subcarrier signals by n optical orthogonal modulation units, in which each of the optical orthogonal modulation units receives the continuous light divided by the optical dividing unit, divides each of the divided continuous light into two paths, and modulates the divided continuous light in each path, and performs phase-shift modulation by delaying one of the divided continuous light of one path by $\pi/2$ and combining with another one of the divided continuous light in another path, thereby generating the optical subcarrier signals;

a step of combining the optical subcarrier signals of the n optical orthogonal modulation units by an optical combining unit;

a step of outputting drive signals to the n optical orthogonal modulation units by a modulator drive signal generation unit, in which transmission data have been converted to the drive signals of the optical orthogonal modulation units, wherein the step of outputting drive signals converts the transmission data into two pieces of parallel data: A(t) and B(t), generates an I-phase signal resulting from A(t)+B(t) modulated with a clock signal with an angular frequency $\omega$ and a Q-phase signal resulting from A(t)−B(t) modulated with a signal that is out of phased by $\pi/2$ from the clock signal, applies the I-phase signal and the Q-phase signal to corresponding electrodes of the paths of the optical orthogonal modulation units, and generates optical subcarrier signals, wherein a center of frequencies of the optical subcarrier signals having a differential frequency $\Delta\omega$ corresponds to a frequency of an optical carrier.

\* \* \* \* \*